United States Patent [19]

Schraub

[11] Patent Number: 5,070,902
[45] Date of Patent: Dec. 10, 1991

[54] LATERAL ORIFICE WATER REGULATOR

[75] Inventor: John Schraub, Huntsville, Tex.

[73] Assignee: McMurry Oil Tools, Inc., Huntsville, Tex.

[21] Appl. No.: 622,861

[22] Filed: Dec. 5, 1990

[51] Int. Cl.⁵ ............................................. F16K 17/34
[52] U.S. Cl. ................................... 137/504; 137/508; 251/86
[58] Field of Search ................. 137/504, 508; 251/85, 251/86

[56] References Cited

U.S. PATENT DOCUMENTS

| 2,623,331 | 12/1952 | Greening | 137/508 |
| 2,967,543 | 1/1961 | Viergutz | 137/504 X |
| 3,431,944 | 3/1969 | Sakuma | 137/504 X |
| 3,593,742 | 7/1971 | Taylor | 137/504 |
| 4,080,993 | 3/1978 | Lind | 137/504 |
| 4,785,847 | 11/1988 | Steer et al. | 137/508 X |

FOREIGN PATENT DOCUMENTS 1066973  11/1979  Canada ............................... 137/508

*Primary Examiner*—Stephen M. Hepperle

[57] ABSTRACT

A water injection valve for use in a well bore having a cylindrical valve body with an axial water passage, a cylinder slidably mounted therein with an upstream control shoulder, lateral fluid ports in the cylinder upstream of the seal between the cylinder and the valve body and an open downstream end which restricts fluid flow when the cylinder impinges upon a conical valve seat. The cylinder is adjustably biased away from the valve seat by a spring and permits fluid flow no greater than a predetermined maximum rate despite increases in pressure differential across the valve.

1 Claim, 1 Drawing Sheet

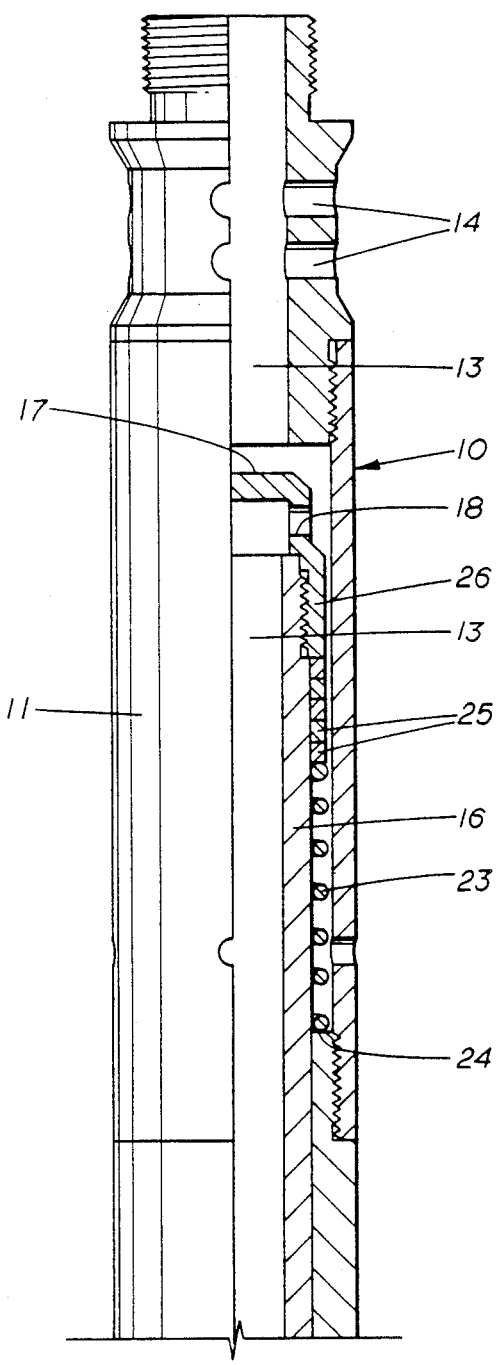
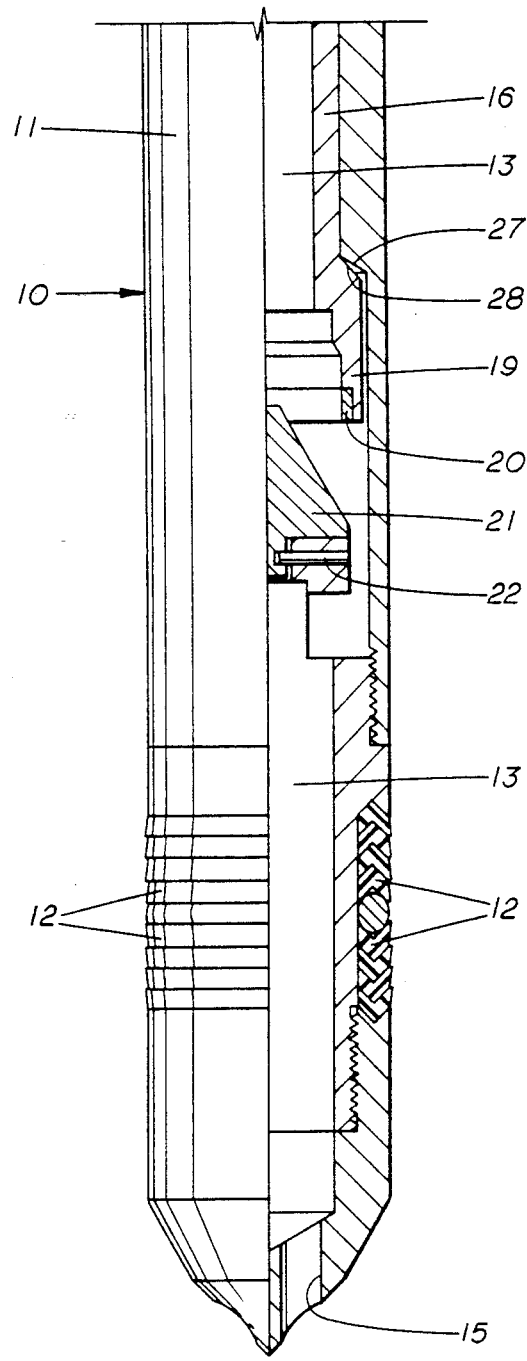
FIG.1A
FIG.1B

LATERAL ORIFICE WATER REGULATOR

A. FIELD OF THE INVENTION

This invention relates to apparatus and methods for controlling liquid injection from a bore hole into a subterranean formation through which the bore hole has been drilled. More particularly, the invention relates to liquid injection for waterfloods or formation treatment which permits a large liquid flow at a predetermined maximum flow rate.

B. PRIOR ART

Various attempts have been made at controlling liquid injection from the bore hole of a drilled well into a subterranean formation. Attempts to control flow rate of fluids to be injected in a waterflood operation from the surface have proved difficult in operation. The hydrostatic head from the surface to the depth of the formation and the pressure at which surface pumps operate can be controlled, but the back pressure to flow which the formation exhibits and the degree of saturation of the formation change over time. Since it is important to control flow rate so as not to damage an oil-bearing formation in the waterflood process, the best mechanism of control is a limiting regulator adjacent the depth of the formation.

In waterfloods requiring high predetermined flow rates, the limiting feature of such regulators is the diameter of the bore hole, the mandrel therein and the side pocket into which the flow regulation valve must fit. The larger the size of casing, the more expensive the installation becomes. For a given size of casing and side pocket size, flow rate of liquids through prior art flow regulators has been limited by the diameter of water passage which may be drilled in the upper shoulder of the cylinder of the valve. The cylinder limits the maximum flow rate through the valve by balancing the tension of the spring which biases the skirt of the cylinder away from the conical valve seat and against the direction of water flow with the size of the orifice drilled in the upstream shoulder of the cylinder. The smaller the orifice, the smaller the maximum flow rate the valve will permit. The larger the orifice, the greater the maximum flow the valve will permit.

However, as the orifice in prior art valves is enlarged, the remaining area of the shoulder is less, and the force exerts on the remaining portion of the shoulder (the pressure differential across the orifice) to act against the biasing force of the spring decreases. The force required to bring the position of the cylinder into balance, and therefore into a position which limits maximum flow through the valve, becomes too great. Thus, there is an upper limit of orifice area to remaining shoulder area past which the valve ceases to function properly to limit high flow rates. The prior art valves, given limited diameters in downhole applications, have been limited in maximum predetermined flow rate that can be achieved.

C. SUMMARY OF THE INVENTION

The present invention includes a cylindrical valve body having a generally axial flow path, a conical valve seat, a generally cylindrical sleeve spring-biased against the flow of liquid through the axial flow path, said sleeve having a closed shoulder interposed in the axial flow path and at least one lateral opening in the sleeve adjacent the shoulder for permitting flow in the axial flow path. The sleeve also includes a skirt which cooperates with the valve seat for limiting flow rate despite increased flow pressure across the valve, and means for limiting movement away from the valve seat during minimum pressure differential across the valve.

The configuration of the lateral flow port or ports adjacent the shoulder in effect leaves unchanged the surface area across which the differential flow pressure can act. Thus, a larger orifice, and hence, greater maximum flow rates can be achieved for a given value diameter by placing the orifice in the cylindrical surface adjacent the closed shoulder.

D. BRIEF DESCRIPTION OF THE DRAWINGS

FIGS. 1A and 1B, respectively, the upstream and downstream portions, in partial cross sectional elevation view, of the preferred embodiment of the invention.

E. DESCRIPTION OF THE PREFERRED EMBODIMENT

Referring to FIGS. 1A and 1B, a valve 10 is shown. Valve 10 is adapted to be inserted in the side pocket of a mandrel (not shown) in a downhole drill string. The mandrel is inserted at a subsurface point in a string of water injection tubing (not shown) which conducts water from pumps (not shown) at the wellhead installation on the surface to the axial passage 13 of valve 10. The mandrel also includes a plurality of exit ports (not shown) which inject water that has passed from the surface pumps, through axial passage 13 in valve 10 and into the subterranean formation (not shown).

Valve 10 includes in this embodiment a generally cylindrial valve body 11 having exterior seals 12 for sealing engagement with the interior wall of a side pocket of a mandrel (not shown). Valve body 11 forms a generally axial flow path 13 from the valve inlets 14, through valve 10, and terminating at the valve outlet 15.

Valve body 11 contains a cylindrical sleeve 16 slidably mounted therein. Sleeve 16 includes at its upstream end (by water flow direction) a closed shoulder 17 against which fluid flow impinges in axial passage 13. Sleeve 16 also includes an opening or orifice 18 on the cylindrical surface of sleeve 16 adjacent closed shoulder 17. Depending upon the maximum flow rate desired, one or more of orifice 18 openings may be utilized in sleeve 16. Valve 10 is sealed against water leakage between sleeve 16 and valve body 11 by the close tolerance fit from spring mount 24 to the limit detent 27. Orifice 18 continues axial flow path 13 and permits water to flow into the central or axial portion of sleeve 16. The lower, or open end of sleeve 16 forms a skirt 19. The radially inner surface of skirt 19 includes a wear resistant insert 20 to resist abrasion and wear caused by the passage of liquids down axial flow path 13.

Fixed within valve body 11 is a generally conical valve seat 21 which cooperates with skirt 19 to restrict flow through axial flow path 13. Valve seat 21 is mounted in valve body 11 on a mounting pin 22 with sufficient clearance for valve seat 21 to move a short radial distance to seat concentrically of skirt 19.

Cylindrical sleeve 16 is biased in the open flow position as shown in FIGS. 1A and 1B by a spring 23 mounted on spring mount 24 on valve body 11. The tension on spring 23 and the size of orifice 18 determine the maximum flow rate of a given liquid which may pass through axial flow path 13. The tension on spring 23 may be varied within certain ranges by increasing or decreasing the number of the spacers 25 inserted between the orifice cap 26 and the end of spring 23 acting against sleeve 16.

In operation, water pumped into valve inlets 14 flows through axial flow path 13, impinges upon and flows around closed shoulder 17 and passes through orifice 18 into the interior of cylindrical sleeve 16. Since the valve is biased open (or toward the upstream end of valve 10) by spring 23 in low flow rate conditions, water continues down axial flow path 13, between skirt 19 and valve seat 21 and out valve outlet 15. Sleeve 16, at very low flow rates, is limited in its upstream movement by the cooperation of limit detent 27 sleeve 16 and the cylinder stop 28 on sleeve 16. Valve outlet 15 is aligned with an exit opening in the side pocket of the mandrel (not shown) in which the valve is seated. The water pumped through valve 10 flows out that opening and into an adjacent subterranean formation.

As pumping pressure increases, flow rate through orifice 18 increases and creates a pressure differential across orifice 18. The pressure differential acts on the cross-sectional area of the outer diameter of sleeve 18, substantially attributable to the area of closed shoulder 17, and against spring 19 to move sleeve 18 and skirt 19 closer to valve seat 21. As maximum flow rate is reached, skirt 19 approaches an equilibrium position at a distance from valve seat 21, and the narrowing of the passage between skirt 19 and valve seat 21 increases pressure within cylinder 21 and eventually substantially causes a constant pressure differential across orifice 18 to be established. Within practical operating pressures the constant pressure differential across orifice 18 yields a predetermined maximum flow rate through valve 10.

Thus, for a given tension of spring 23, a given number of spacers 25 and size and number of orifice 18 openings, a maximum predetermined flow rate of a given fluid can be established. Within normal pump pressure ranges, the predetermined maximum flow rate remains constant despite overpressures from surface pumping facilities and variations in formation capacity and pressure as the waterflood or other operation progresses.

The table below, shown for a valve 1.5 inches in diameter, lists maximum flow rates obtained for different orifice sizes and spacers. The tension of a standard spring used in the embodiment is 83 pounds per inch of cylinder travel or spring compression.

Maximum flow rates for valves with orifices in the shoulder surface, rather than the lateral surface as in the present invention, of equal diameter have been shown to be approximately 1500 barrels per day (BPD). The orifice size of prior art valves is limited due to the need for shoulder surface to generate the pressure forces across the effective area of the cylinder shoulder. As the orifice size in the shoulder increases, the ability to develop the pressure forces across the remaining shoulder containing the orifice decreases. By contrast, the effective area across which the present invention generates pressure forces is held constant and ability to increase flow and maintain control of maximum flow is enhanced.

Thus, it can be seen that a novel arrangement for downhole valves has been shown. Variations in arrangement of features and reversal of certain structures can be made without departing from the teaching of the invention, all as would be apparent to one skilled in the art.

What is claimed is:

1. In a valve for controlling maximum liquid flow rate, the combination comprising:

a cylindrical valve body having a generally axial flow path;

a conical valve seat mounted in said valve body;

a generally cylindrical sleeve which is spring-biased against the flow of liquid through said axial flow path, said sleeve having an axially closed shoulder obstructing said axial flow path and at least one lateral opening adjacent said shoulder upstream of the seal between said cylinder and said valve body for permitting fluid flow in said axial flow path;

said sleeve having a skirt including a wear resistant insert opposite said shoulder cooperating with said valve seat for limiting the rate of axial flow through said flow path to a predetermined maximum despite increased differential flow pressure across said valve;

means for limiting axial movement of said sleeve away from said valve seat during minimal pressure differential across said valve and, valve seat mounting means in said valve body mounted so as to permit limited radial and axial movement for maintaining alignment with said skirt.

* * * * *

| Orifices | | Spacer Thickness | Constant Flow Rate (BPD) Fresh Water | | | | | | | | | |
|---|---|---|---|---|---|---|---|---|---|---|---|---|
| No. | Diam | | 0.125 | 0.250 | 0.375 | 0.500 | 0.625 | 0.750 | 0.875 | 1.000 | 1.125 | 1.250 |
| 12 | .171 | | | | | | | | | | 2663 | 2764 |
| 10 | .171 | | | | | | | | | 2460 | 2562 | 2660 |
| 8 | .171 | | | | | | | 2038 | 2139 | 2236 | 2328 | 2417 |
| 6 | .171 | | | | | 1531 | 1625 | 1715 | 1799 | 1880 | 1957 | 2032 |
| 4 | .171 | | | | | | 1203 | 1269 | 1331 | 1391 | 1448 | 1502 |
| 3 | .171 | | | | 835 | 893 | 947 | 999 | 1048 | 1095 | 1140 | 1183 |
| 2 | .171 | | | | | | | 698 | 732 | 765 | 796 | 826 |
| 2 | .156 | | | 450 | 486 | 520 | 552 | 582 | 610 | 637 | 663 | 688 |
| 1 | .171 | | | | | | | 372 | 390 | 407 | 424 | 440 |
| 1 | .156 | | | 239 | 258 | 276 | 293 | 309 | 324 | 338 | 352 | 365 |
| 1 | .125 | | 139 | 153 | 165 | 176 | 187 | 197 | 207 | 216 | 225 | 233 |